April 1, 1924.  1,488,565
G. W. STEWART ET AL
POROUS DAMPER FOR ACOUSTICAL INSTRUMENTS
Filed July 11, 1919
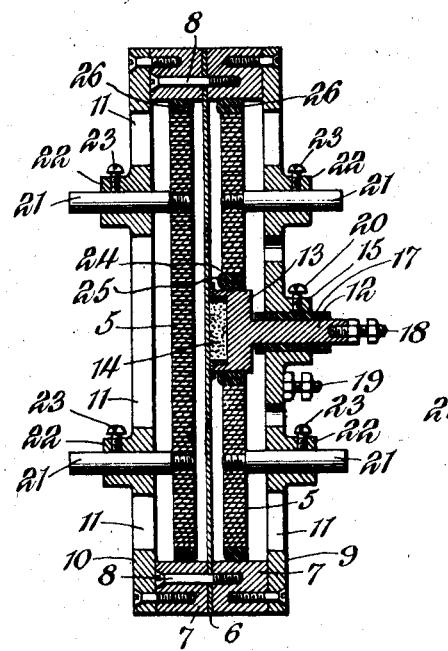
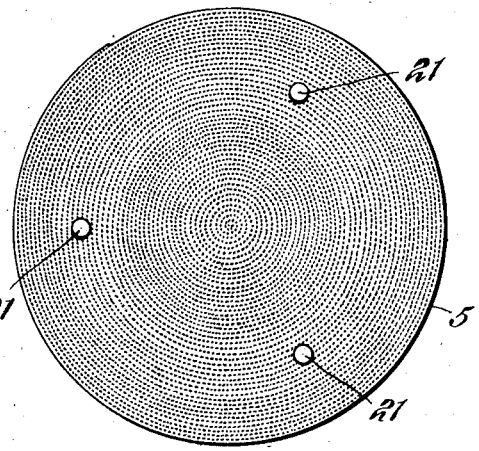
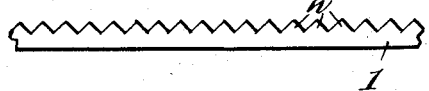
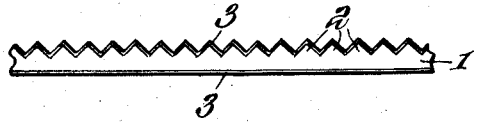
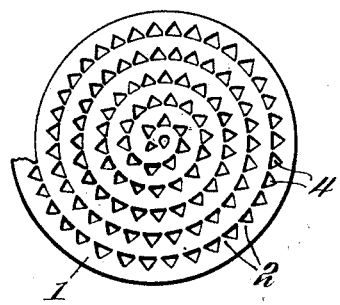
G. W. Stewart,
J. B. Dempster
and H. L. Dodge,
INVENTORS,
WITNESSES
Howard D. Orr.
H. T. Chapman.
BY
E. G. Siggers
ATTORNEY Patented Apr. 1, 1924.

1,488,565

UNITED STATES PATENT OFFICE.

GEORGE W. STEWART, JAMES B. DEMPSTER, AND HOMER L. DODGE, OF IOWA CITY, IOWA.

POROUS DAMPER FOR ACOUSTICAL INSTRUMENTS.

Application filed July 11, 1919. Serial No. 310,164.

*To all whom it may concern:*

Be it known that we, GEORGE W. STEWART, JAMES B. DEMPSTER, and HOMER L. DODGE, citizens of the United States, residing at Iowa City, in the county of Johnson and State of Iowa, have invented a new and useful Porous Damper for Acoustical Instruments, of which the following is a specification.

This invention has reference to porous dampers or filters for acoustical instruments and the method of producing the filters.

The object of the invention is to provide means for filtering out certain disturbing characteristics of sound waves, affecting some frequencies more than others, whereby the character of the sound, or of the effects produced when sound waves are caused to set up other actions, such as the production of electrical undulations in the telephonic transmission of speech, is clarified or otherwise beneficially changed.

In carrying out the invention, there is provided a filter through which the sound waves must pass, either toward or from the diaphragm, which filter provides minute passages through which the air vibrations are transmitted, and such filter provides means whereby the filtering effect and the damping of the vibrations of the diaphragm may be controlled.

The invention furthermore provides for the production of a porous damper or filter of metal or other material, whereby the character, size, shape, and other features of the pores may be made such as are needed for the effects desired.

The invention will be best understood from a consideration of the following detailed description, taken in connection with the accompanying drawing forming part of this specification, with the understanding that the invention is not confined to any strict conformity to the showing of the drawing, or with the method of manufacturing the filter, but may be changed or modified, so long as such changes and modifications mark no material departure from the salient features of the invention, as expressed in the appended claims.

In the drawing—

Figure 1 is a diametric section through a telephone transmitter, or other microphonic instrument, constructed in accordance with the invention.

Figure 2 is a face view of a filter embodying the invention.

Figure 3 is a fragmentary view on an enlarged scale, of a strip from which the filters or dampers may be made.

Figure 4 is a view similar to Figure 3, but showing one face of the strip transversely corrugated or grooved.

Figure 5 is a view similar to Figure 4, but showing a coating of solder or other suitable material on the opposite faces of the strip.

Figure 6 is a fragmentary view of the strip of Figure 5, rolled upon itself into spiral form.

Referring first to Figures 3 to 6, which show steps in the manufacture of a metallic filter or porous damper, there is shown in Figure 3 a portion of a strip 1, which may be considered as a flat strip of suitable length and wider than thick, the showing of Figure 3 being much exaggerated. The strip 1 is passed through suitable rolls, or is otherwise treated to form one face into a series of teeth or corrugations 2, either in the form of angular teeth, or in other form producing alternate ridges and valleys. It is within the invention to produce corrugations on both opposite faces of the strip 1, but for simplicity of description, it may be considered that the corrugations 2 are produced on but one face of the strip 1. In the progress of the formation of the filter or porous damper, the strip 1 is first coated with solder, the coating being indicated at 3 in Figure 5, and the solder-coated strip is corrugated by being passed through suitable rolls which squeeze out surplus solder from the valleys of the corrugations. The solder-coated strip 1 is then wound upon itself into spiral form, as indicated in Figure 6, with the ridges or peaks of the corrugations against the plane face of the strip, thus producing, in the particular structure under consideration, a plurality of passages 4, and as such corrugations, in practice, may be very minute, the passages 4 are likewise minute and numerous.

The coiled-up strip 1 is sufficiently extensive to produce a flat plate 5, shown in face view in Figure 2, and in cross section in Figure 1.

After the strip 1 is coiled up as described, it is subjected to heat sufficient to melt the solder coating, so that where the ridges of the corrugations engage the plane face of the strip, the solder runs together, and thus cements the strip so that it retains its coiled-up shape. The melting of the solder is liable to produce uneven conditions, and therefore it is desirable to machine the surfaces of the plate. For this purpose, and to prevent mashing or distortion of the passages 4, such passages are filled with paraffine, or other material sufficiently resistant to the machining operation, after which the paraffine, or other filling material, may be melted or dissolved out of the passages, leaving them free and undisturbed.

The process of making the filter or porous damper permits a control of the number, size, shape and length of the passages 4, and a corresponding control of the effect of these passages upon sound vibrations traversing them.

In order that the use of the filter or porous damper may be better understood, a microphonic instrument employing such structure is shown in Figure 1. The instrument includes a diaphragm 6, such as is customarily used in telephone transmitters, and the diaphragm is clamped at the edges between two rings 7, by means of screws 8, or in any other appropriate manner. The rings 7 have secured to them face plates 9 and 10, respectively, and these plates have passages 11 therethrough, produced in any suitable manner, as by making the plates skeleton plates, so that such plates will offer no sensible impediment to the free passage of air vibrations toward or from the diaphragm. The plates 9 and 10 have no damping effect, and are merely provided for supporting certain structures.

There is also provided a stem 12, having a cup 13 at one end for containing a mass 14 of carbon granules, constituting an ordinary microphonic element. The stem 12 is carried by a boss 15, formed centrally on the plate 9, and insulated from the boss by an insulating sleeve 17. The stem 12 is also provided with a binding post 18, for the attachment thereto of one terminal of a microphone circuit, and secured to the plate 9, at some convenient point, is another binding post 19 for the attachment to the plate or frame 9 of the other terminal of the microphone circuit. A set screw 20, carried by the boss 15, serves to hold the microphonic element in proper relation to the diaphragm 6.

The filters or porous dampers 5 are provided with studs 21, lodged in bosses 22, similar to the boss 15, and held in place by set screws 23. In the particular structure shown in Figure 1, a filter plate 5 is provided on each side of the diaphragm 6, and is suitably spaced therefrom. Because of the presence of the microphonic element, one of the filter plates has a central passage 24, of sufficient size to pass the cup 13, and this passage 24 is also sufficiently larger than the cup 13 to admit of the introduction of a washer 25 in surrounding relation to the cup. The washer may be of rubber, or other suitable material to practically fill and seal the passage 24 about the cup 13, so that no air vibrations can pass through. The marginal portions of each plate 5 are each provided with a rubber washer or gasket 26, sealing the space between the periphery of the plate 5 and the ring 7. In this manner, air vibrations can reach the diaphragm 6 from the outside, or can be set up by the diaphragm and transmitted away therefrom only through the passages 4 in the filter or damper.

Considering the structure of Figure 1 as a microphonic transmitter, sound waves reach the diaphragm 6 through one or both of the filters 5, it being understood that the instrument may be provided with a single filter 5, or with two filters, one on each side of the diaphragm, as shown in the drawing. Sound in passing to the diaphragm 6— and for simplicity of description it will be considered that one filter is used—must traverse the porous damper or filter 5, and because of the minute passages through which it must travel, the sound becomes altered in character. The effect of the filter upon certain frequencies of a complex sound will be different from its effect upon other frequencies. The filter, therefore, will damp out certain frequencies more than others, its effect being controllable by altering the size, shape, length, number, etc., of the passages or channels 4. The smaller the holes or passages, the greater is the damping of the sound. The higher the frequency of the sound vibrations, the greater is the damping. The longer the holes or passages 4, the greater is the damping. The physical laws which govern the damping of the sound waves of high frequency without appreciable loss of those of low frequency are fully explained and demonstrated by Lord Rayleigh on page 332, volume II, of his treatise entitled "Theory of sound." A complex sound, therefore, will come through such a filter or damper reduced in intensity with the reduction greatest for the components of highest frequency. If the channels 4 are not constant in size, there is a reflection at the variations in cross section as well as absorption, but when the channels are constant in size throughout their length, absorption only occurs, wherefore channels of constant size throughout their length are the more efficient, though the invention is not necessarily confined to channels of constant size.

The sound after passing through the porous damper or filter impinges upon the diaphragm 6, causing it to vibrate. Such vibrating diaphragm tends to continue in vibration, with the amplitude of the vibrations falling off with greater or less rapidity. Such falling off in amplitude must be made very rapid if the diaphragm is to follow a highly complex sound or other actuating impulse or force, and this is the purpose of the damper, that is, to cause the rapid falling off or damping of the vibrations of the diaphragm. If the diaphragm is in vibration, the air confined between it and the porous plate or filter, is subjected to changes in pressure of greater or less degree, depending among other things, upon the amplitude of vibrations. Such changes in pressure force the air out and in through the channels of the damper, retarding the motion of the air by the damping action of the damper, wherefore energy is lost, and, in turn, the motion of the diaphragm is damped.

Not only is the damping action dependent upon and controlled by the size and thickness of the damper, and the size and shape of the holes, but also by the relation of the total area of holes to the area of the damper, the distance of the damper from the diaphragm, the area covered by the damper, the presence or absence of airtight washers about the damper, and the size of the gap in case the washers be absent.

We are familiar with the fact that flat plates have been used for damping vibration of a microphone diaphragm, and that these plates have in some instances been pierced by holes. In such cases, the damping effect is secured through the passage of air back and forth in the thin spaces between the diaphragm and plate. The motion of the air is for the most part parallel to the surfaces of the plate and diaphragm. When such plate has been pierced with holes, the purpose has been to allow the air to escape at other places on the plate than at the edges and center. The only limit as to the thinness of the plate was to retain a thickness necessary for mechanical strength. To secure damping action, such a plate must be kept relatively close to the diaphragm, and the size of the channels or passages through which the air was moved changed with the motion of the diaphragm.

The action of the filter or porous damper of the invention is radically different from such a damper plate. The loss of energy is due for the most part to the motion of air in the channels or passages through the porous damper itself. It is for this reason that the thickness of the damper, which controls the length of the channels, is an important factor, and the size, shape, length, total area with respect to the area of the plate, the area of the holes, etc., become factors of importance in the control of the damping effect. Furthermore, the distance of the plate from the diaphragm may be relatively great, and the size of the channels or passages through which the air moves is practically independent of the motion of the diaphragm.

Another advantage of the present method of damping over that with a flat plate is that the latter adds appreciably to the stiffness of the diaphragm, while the former does not do so to any great extent. The herein described method of constructing the damper has the advantage of making tubular pores of controllable size, length and number, but a similar damping plate could be constructed along other lines which would suggest themselves to those skilled in the art. For instance, the passages need not be perpendicular to the face of the diaphragm, nor need they be perfectly straight and uniform in cross section, nor need metal be used. It is not necessary that the damping occur over the whole diaphragm.

As to the size of the pores, no exact limit can be given, but they must be relatively long in comparison with their cross section. Pores of two hundredths or three hundredths of an inch in diameter operate satisfactorily, but they may be larger or smaller.

When a damper is used behind the diaphragm, it will, of course, not be necessary for the pores to extend all the way through, but to extend only for a sufficient depth to absorb the high frequency waves, while the low frequency waves will be reflected back with slight decrease in intensity.

It is also apparent that the filters or porous dampers may be otherwise arranged than in the showing of Figure 1, which showing is to be taken more as illustrative of one of many embodiments of the invention than as confining the invention to the particular showing of Figure 1.

Moreover, the invention may be used in connection with the reception and transmission of sounds and with the recording and reproduction of sounds, wherefore the invention is not to be considered as limited to any particular branch of the acoustical art, but as to applying to any branch of the art to which it may be applicable.

What is claimed is:—

1. A damper for an acoustic instrument consisting of a strip of metal spirally wound into a flat plate, adjacent convolutions of said spiral being suitably held in rigid contact, one edge of said strip being milled or corrugated, said corrugations forming numerous pores through the plate.

2. A damper for an acoustic instrument comprising a strip of metal spirally wound into a flat plate, adjacent convolutions of said spiral being suitably cemented together, one edge of said strip being milled or corrugated so as to form numerous pores through the plate.

3. A damper for an acoustic instrument comprising a strip of metal spirally wound into a flat plate, adjacent convolutions of said spiral being suitably held in rigid contact, one edge of said strip being traversed by numerous minute parallel corrugations of uniform size to form pores through the plate of comparatively small cross sectional area.

4. In an acoustic instrument, the combination with a vibratory diaphragm, of a damper plate associated therewith and provided with minute pores or channels of a diameter and length to absorb or dissipate the major portion of the high pitch components of sound waves passing therethrough and to let through the major portion of the low pitch components of such sound waves.

5. A damper for an acoustic instrument comprising a flat plate formed by juxtaposing plane and corrugated surfaces to form pores or channels extending from face to face of said plate.

6. In an acoustic instrument, the combination with a vibratory diaphragm of porous material, adapted to be interposed in the path of sound waves approaching or receding therefrom, of a damper plate having tubular pores of substantially constant and relatively small cross sectional area throughout their length and extending substantially perpendicular to the diaphragm, whereby the character of the sound wave with respect to the distribution of energy among the different frequencies or pitches is changed.

7. The combination with a vibratory diaphragm, of a filter or damper plate in the path of sound directed toward or away from the diaphragm, said plate being provided with a multiplicity of minute tubular pores or channels therethrough, said pores being relatively long in comparison with their diameter, whereby dissipation of energy is secured by the flow of the vibrating fluid in and through said pores or channels.—

In testimony, that we claim the foregoing as our own, we have hereto affixed our signatures.

GEORGE W. STEWART.
JAMES B. DEMPSTER.
HOMER L. DODGE.

Witnesses:
L. W. W. MORROW,
HAROLD N. BOZELL.